(12) United States Patent
Yamawaki et al.

(10) Patent No.: US 7,725,124 B2
(45) Date of Patent: May 25, 2010

(54) SEMICONDUCTOR DEVICE AND MODULE HAVING A TRANSCEIVER WITH A BUILT-IN REGULATOR

(75) Inventors: Taizo Yamawaki, Tokyo (JP); Yoshiaki Harasawa, Maebashi (JP)

(73) Assignee: Renesas Technology Corp., Tokyo (JP)

( * ) Notice: Subject to any disclaimer, the term of this patent is extended or adjusted under 35 U.S.C. 154(b) by 746 days.

(21) Appl. No.: 11/246,253

(22) Filed: Oct. 11, 2005

(65) Prior Publication Data

US 2006/0084399 A1    Apr. 20, 2006

(30) Foreign Application Priority Data

Oct. 19, 2004   (JP)   .............................. 2004-303880

(51) Int. Cl.
*H04B 1/28* (2006.01)
*H04M 1/00* (2006.01)
*H04B 1/38* (2006.01)

(52) U.S. Cl. ................. 455/550.1; 455/333; 455/556.1; 455/572; 257/500; 257/663

(58) Field of Classification Search ............. 455/78–88, 455/550.1–553.1, 556.1, 252.1, 333, 572–574, 455/127.1–127.5, 343.1–343.6; 257/499–502, 257/663, 723, 728
See application file for complete search history.

(56) References Cited

U.S. PATENT DOCUMENTS

| | | | | |
|---|---|---|---|---|
| 5,666,355 | A * | 9/1997 | Huah et al. ................... | 370/311 |
| 6,809,952 | B2 * | 10/2004 | Masui ........................ | 365/145 |
| 6,836,417 | B2 * | 12/2004 | Hiraki et al. ................. | 323/268 |
| 6,848,620 | B2 * | 2/2005 | Nakane et al. ............... | 235/492 |
| 7,149,246 | B1 * | 12/2006 | Adams et al. ................ | 375/238 |
| 7,209,770 | B2 * | 4/2007 | Agari et al. .................. | 455/572 |
| 7,212,047 | B2 * | 5/2007 | Kimura et al. ............... | 327/148 |
| 7,236,758 | B1 * | 6/2007 | Cheah et al. ............. | 455/252.1 |
| 7,321,755 | B2 * | 1/2008 | Hulvey ..................... | 455/343.1 |
| 7,336,706 | B2 * | 2/2008 | Krafft et al. .................. | 375/238 |
| 2002/0163063 | A1 * | 11/2002 | Noguchi et al. .............. | 257/666 |
| 2005/0208914 | A1 * | 9/2005 | Ogawa ..................... | 455/193.1 |
| 2006/0267193 | A1 * | 11/2006 | Akiyama et al. ............. | 257/725 |
| 2007/0155442 | A1 * | 7/2007 | Watanabe et al. ............ | 455/572 |

FOREIGN PATENT DOCUMENTS

EP          1 248 378  A1     1/2000

(Continued)

*Primary Examiner*—Simon D Nguyen
(74) *Attorney, Agent, or Firm*—Mattingly & Malur, P.C.

(57) ABSTRACT

An object of the present invention is to provide a transmitter-receiver RF-IC having a built-in regulator, which can reduce a minimum value of an input voltage of the regulator without increasing its area, the input voltage being supplied from a battery, the transmitter-receiver RF-IC being capable of normal operation with the input voltage, whereby the operating time of a mobile terminal can be improved as compared with the prior art.

According to the present invention, in order to achieve the above object, an output end of a regulator built into a RF-IC is first led to the outside of the RF-IC. Then, the output end is led to an area in proximity to the circuit block by use of wiring on a mobile terminal substrate whose resistance is low, or by use of wiring on a module whose resistance is low, thereby shortening the wiring length inside the RF-IC.

16 Claims, 8 Drawing Sheets

FOREIGN PATENT DOCUMENTS

| | | |
|---|---|---|
| JP | 5-121650 | 5/1993 |
| JP | 6-163700 | 6/1994 |
| JP | 2001-94459 | 4/2001 |
| JP | 2002-95057 | 3/2002 |
| JP | 2003-229782 | 8/2003 |
| WO | WO 99/19991 | 4/1999 |
| WO | WO 01/52427 | 1/2000 |

* cited by examiner

SEMICONDUCTOR DEVICE AND MODULE HAVING A TRANSCEIVER WITH A BUILT-IN REGULATOR

CLAIM OF PRIORITY

The present application claims priority from Japanese application JP2004-303880, filed on Oct. 19, 2004, the content of which is hereby incorporated by reference into this application.

BACKGROUND OF THE INVENTION

1. Field of the Invention

The present invention relates to a transmitter-receiver with a built-in regulator used for a mobile terminal.

2. Description of the Related Arts

FIG. 7 is a block diagram illustrating how a GSM (Global System for Mobile communications)-capable mobile terminal is in general configured (for example, refer to FIG. 5 in PCT Patent Laid-open No. WO01/052427). This mobile terminal includes: a base band (hereinafter referred to as "BB") 102; a transmitter-receiver RF-IC (hereinafter referred to as "RF-IC"); a power amplifier (hereinafter, refer to as PA) 103; an SAW filter (hereinafter refer to as SAW) 104e; and an antenna switch (hereinafter referred to as "ASW") 105. The BB 102 subjects audio and data to proper signal processing such as encoding, error correction, or modulation and demodulation. The RF-IC subjects an IQ signal coming from the BB 102 to proper processing such as frequency conversion or amplification before outputs the signal to the PA 103. In addition, the RF-IC receives as an input signal an output signal of the SAW 104e to subjects the input signal proper processing such as frequency conversion or amplification before outputs an IQ signal to the BB 102. The PA 103 adds a proper gain to an output signal of the RF-IC. The SAW 104e suppresses unnecessary signals. The ASW 105 is used to properly connect the antenna 111 to the SAW 104e or the PA 103. Since GSM applies the time-division multiplexing (TDMA) method, the antenna 111 is connected to an output end of the PA 103 at the time of transmission, whereas the antenna 111 is connected to an input end of the SAW 104 at the time of receiving. A voltage Vbat is applied to the power supply of the PA 103. Usually, the voltage Vbat is directly supplied from a battery of the mobile terminal. Reference numeral 113d denotes a voltage stabilization regulator (hereinafter referred to as "regulator"). The regulator receives the voltage Vbat as an input voltage, and outputs a voltage that is suitable for the RF-IC 101. For example, the regulator converts a value of the voltage Vbat from 5 V to 2.8 V before outputting the voltage Vbat. An output voltage of the regulator 113d is supplied through wiring 502 to circuit blocks 500a, 500b inside the RF-IC 101. The wiring 502 includes wiring on a mobile terminal substrate, and wiring inside IC. As shown in the figure, power supply wiring of the circuit block 500a and that of the circuit block 500b are separately led out from the RF-IC 101 to the outside so that the length of the wiring inside IC becomes as short as possible.

In recent years, mobile terminals require not only basic functions as a telephone but also additional functions including data communications, a camera function, and a bluetooth function. For this reason, further miniaturization is required for each part constituting a mobile terminal. The RF-IC has been improved in integration degree in order to satisfy the requirement of miniaturization.

SUMMARY OF THE INVENTION

FIG. 8 is a diagram illustrating as an example a configuration used to achieve a further improvement in integration degree of a RF-IC on the basis of the configuration of the general mobile terminal shown in FIG. 7. A regulator 113e is integrated into the RF-IC 101. From the regulator 113e built into the RF-IC, the power supply is supplied to circuit blocks 500a, 500b inside the RF-IC 101 by use of wiring 600 inside the RF-IC 101.

In FIG. 8, the distance from the regulator 113e to the circuit block 500b is long, which causes a value of the wiring resistance to increase. As a result, the voltage drop in wiring becomes larger. For example, on the assumptions that the current consumption of the circuit block 500b is 120 mA, and that the wiring resistance between the regulator 113e and the circuit block 500b is 5Ω, the voltage drop is calculated as follows: 120 mA×5=0.6 V. On the other hand, the wiring between the regulator 113d and the circuit block 500b in FIG. 7 includes, for the most part, wiring on the mobile terminal whose resistance is small. Accordingly, because wiring inside the RF-IC 101 is short, the wiring resistance of the wiring between the regulator 113d and the circuit block 500b is smaller than that between the regulator 113e and the circuit block 500b. For example, the wiring resistance is 1Ω. Therefore, the voltage drop is calculated as follows: 120 mA×1=0.12 V. Since the voltage Vbat is usually an output voltage of a battery, its value decreases when the mobile terminal is used. As described above, with reference to FIGS. 7 and 8, the difference in voltage drop caused by the wiring resistance is 0.48 V (=0.6 V−0.12 V). On the assumption that the RF-IC 101 is capable of normal operation with the voltage Vbat whose value is 3 V or more in FIG. 7, the RF-IC 101 is capable of normal operation only with the voltage Vbat whose value is 3.48 V (=3 V+0.48 V) or more in the case of the configuration in FIG. 7. Therefore, the configuration in FIG. 7 produces a problem in that the operating time of the mobile terminal is shortened. In addition, if the width of the wiring is increased to reduce the wiring resistance inside the RF-IC 101, the area of the RF-IC 101 is increased, leading to another problem of higher costs.

An object of the present invention is to solve the above problems, and to achieve the miniaturization of a RF-IC with a built-in regulator without the operating time of a mobile terminal being shortened.

According to the present invention, in order to solve the above problems, an output end of a regulator built into a RF-IC is first led to the outside of the RF-IC instead of connecting the output end directly to a circuit block by use of wiring inside the RF-IC. Then, the output end is led to an area in proximity to the circuit block by use of wiring on a mobile terminal substrate whose resistance is low, or by use of wiring on a module whose resistance is low, thereby shortening the wiring length inside the RF-IC. This makes it possible to reduce the wiring resistance between the regulator built into the RF-IC and the circuit block, and thereby to reduce the voltage drop. As a result, the RF-IC can operate with the lower voltage of the battery.

The transmitter-receiver RF-IC with a built-in regulator according to the present invention can produce an effect that it is possible to reduce a minimum value of an input voltage of the regulator without increasing the area of the RF-IC, the input voltage being supplied from the battery, the RF-IC being capable of normal operation with the input voltage, whereby the operating time of a mobile terminal can be improved as compared with the prior art.

DETAILED DESCRIPTION OF THE PREFERRED EMBODIMENTS

Preferred embodiments according to the present invention will be described with reference to drawings below.

Figure 1:
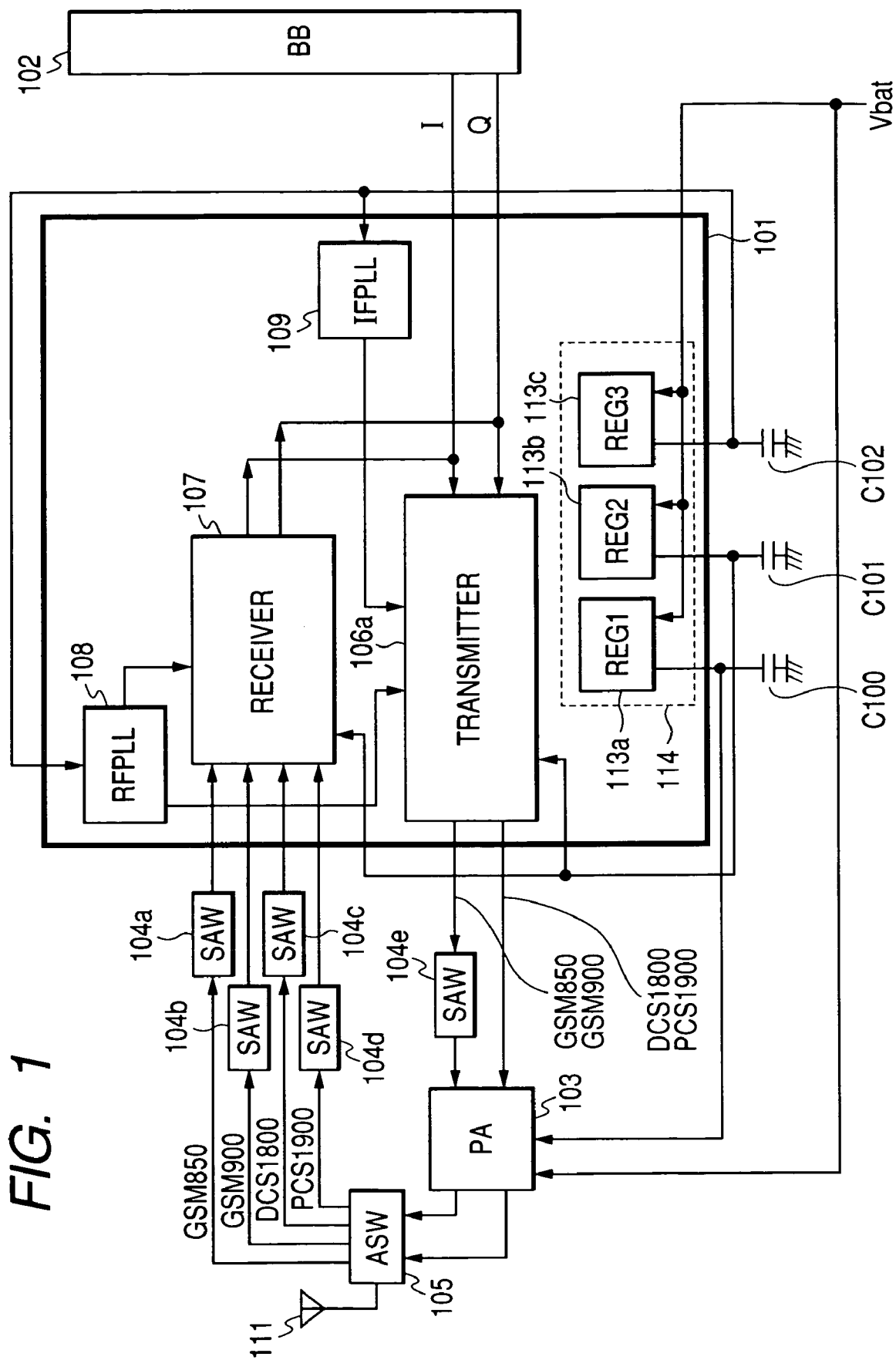
FIG. 1 is a diagram illustrating one embodiment of a mobile terminal that uses a transmitter-receiver with a built-in regulator.

FIG. 1 is a block diagram illustrating how the essential part of a mobile terminal compatible with GSM 850, GSM 900, DCS 1800 and PCS 1900 is configured according to one embodiment of the present invention.

As shown in FIG. 1, the mobile terminal according to this embodiment comprises a RF-IC 101, a BB 102, a PA 103, SAWs 104a through 104e, an ASW 105, a transmitter 106a, a receiver 107, a RFPLL 108, an IFPLL 109, an antenna 111, a regulator part 114, and capacitors C100 through C102. The regulator part 114 includes regulators 113a through 113c. The SAWs 104a, 104b, 104c and 104d are receiving SAWs used for GSM 850, GSM 900, DCS 1800 and PCS 1900 respectively, and are used to suppress unnecessary signals.

The SAW 104e is a transmission SAW used for GSM 850, GSM 900, and is used to suppress unnecessary signals.

With the objective of generating from an input IQ signal an output signal having a desired transmit frequency, the transmitter 106a performs quadrature modulation and frequency conversion by use of output signals of the RFPLL 108 and of the IFPLL 109. In addition, the transmitter 106a properly performs amplification, filtering, and the like. In the case of the GSM 850 or the GSM 900, the above output signal is output to the SAW 104e. In the case of the DCS 1800 or the PCS 1900, the above output signal is output to the PA 103. It is to be noted that although the output signals of the RFPLL 108 and of the IFPLL 109 are used in this embodiment, the present invention is not limited to this example. Depending on a configuration of the transmitter 106a, only the RFPLL 108 is used in some cases.

With the objective of generating an output IQ signal from an input signal, the receiver 107 performs quadrature demodulation and frequency conversion by use of an output signal of the RFPLL 108. Further, the receiver 107 properly performs amplification, filtering, and the like. In the case of the GSM 850, the GSM 900, the DCS 1800, or the PCS 1900, the above input signal is inputted from the SAW 104a, the SAW 104b, the SAW 104c, or the SAW 104d respectively. It is to be noted that although the output signal of the RFPLL 108 is used in this embodiment, the present invention is not limited to this example. Depending on a configuration of the receiver 107, an output signal not only of the RFPLL 108 but also of the IFPLL 109 is used in some cases.

The RFPLL 108 is a frequency synthesizer used to output a signal having a specified frequency.

The IFPLL 109 is a frequency synthesizer used to output a signal having a specified frequency.

The regulator 113a receives a voltage Vbat as an input signal and outputs a specified voltage to the PA 103. The PA 103 uses the output voltage from the regulator 113a to generate a bias voltage used for, e.g., an amplifier.

The regulator 113b receives a voltage Vbat as an input signal and outputs a specified voltage. The output voltage is used as a power supply voltage for the transmitter 106a and the receiver 107.

The regulator 113c receives a voltage Vbat as an input signal and outputs a specified voltage. The output voltage is used as a power supply voltage for the RFPLL 108 and the IFPLL 109.

As described above, it is expected that using the dedicated regulator 113a to output a voltage to the PA 103 will produce an effect of reducing a possibility of deterioration in properties caused by unnecessary signals that are mixed from the PA 103 to the transmitter 106a, the receiver 107, the RFPLL 108, and the IFPLL 109. Moreover, it is also expected that using the dedicated regulator 113c to output a voltage to the RFPLL 108 and the IFPLL 109 will produce an effect of: reducing a possibility of deterioration in properties of the RFPLL 108 and of the IFPLL 109 caused by unnecessary signals that are mixed from the PA 103, the transmitter 106a, and the receiver 107; and decreasing the output potential of the regulator at the moment at which each of the transmitter 106a, the receiver 107, and the PA 103 changes its state from an OFF state to an ON state, this decrease in output potential of the regulator causing output frequencies of the RFPLL 108 and of the IFPLL 109 to change, with the result that the reconvergence time required for the output frequencies is shortened.

The output ends of the regulators 113a through 113c are first led out to the outside of the RF-IC 101. Each of the output ends is then led to an area in proximity to each circuit block by use of wiring on a mobile-terminal substrate capable of reducing the wiring resistance. After that, each output end is returned to the inside of the RF-IC 101, and is connected to each circuit block. This makes it possible to shorten the length of wiring inside the RF-IC 101, which wiring is included in wiring from the output end of the regulator to each circuit block. To be more specific, it is possible to reduce the wiring resistance without increasing the width of the wiring inside the RF-IC 101, and thereby to reduce the voltage drop caused by the wiring. Therefore, as compared with a case where the output end of the regulator is directly connected to each circuit block by use of the wiring inside the RF-IC 101, it is possible to decrease a minimum value of the voltage Vbat required for the normal operation of the RF-IC 101 without causing an area of the RF-IC 101 to increase as a result of an increase in line width. As a result, it is possible to lengthen the operating time of the mobile terminal.

The capacitors C100 through C102 are used to prevent each of the regulators 113a, 113b, and 113c from oscillating so that stable operation can be achieved. Capacitance values of the capacitors C100 through C102 need to be large (e.g., 1 μF). Accordingly, if the capacitors C100 through C102 are built into the RF-IC 101, a large area is required, which increases the area of the RF-IC 101, resulting in high costs. For this reason, as shown in the figure, the capacitors C100 through C102 are connected to the outside of the RF-IC 101. In addition, for example, chip parts are used.

Figure 2:
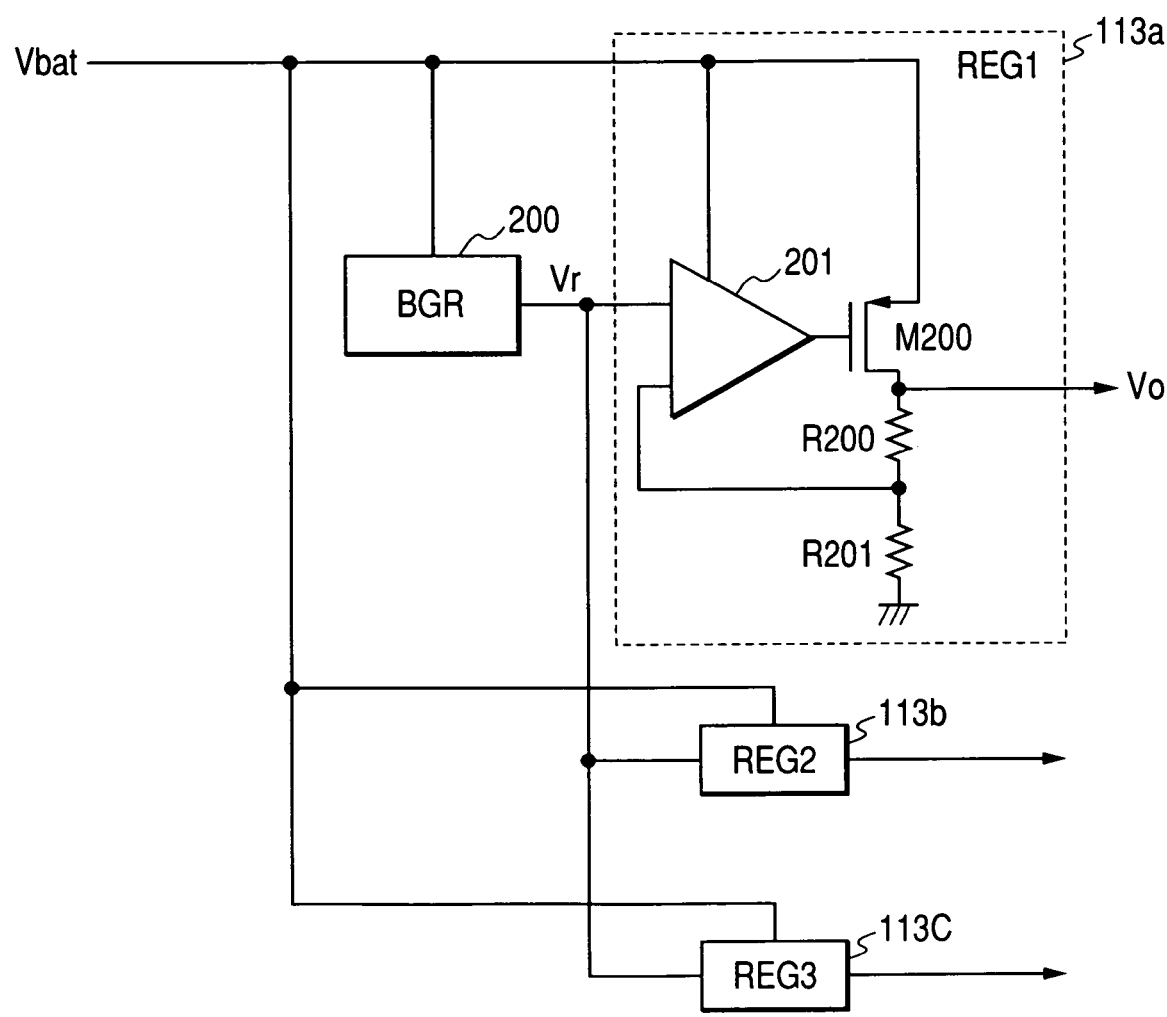
FIG. 2 is a diagram illustrating one embodiment of a regulator part.

FIG. 2 is a diagram illustrating how the essential part of the regulator part 114 shown in FIG. 1 is configured according to one embodiment.

As shown in this figure, the regulator part according to this embodiment comprises a reference-voltage generation circuit (hereinafter referred to as "BGR"), and the regulators 113a through 113c. The regulator 113a includes an operational amplifier 201, a PMOS transistor M200, and resistances R200, R201. The regulators 113b, 113c are also configured in a similar manner. Voltage Vbat is used as a supply voltage applied to the BGR 200 and to the regulators 113a through 113c.

The BGR 200 is a circuit for generating a reference-signal voltage applied to the operational amplifier 201. For example, a band-gap reference circuit is used as the BGR 200. Since a common output signal from the BGR 200 is shared by the regulators 113a through 113c, it is possible to reduce the circuit size.

In a range within which the voltage Vbat is kept sufficiently high so that properties of the BGR 200, the operational amplifier 201, and the PMOS transistor M200 do not degrade, the output voltage Vo is calculated by the following equation:

$$Vo=(1+R200/R201)Vr \quad \text{(Equation 1)}$$

To be more specific, it is found out that irrespective of the voltage Vbat, the output voltage Vo is determined by Vr and the resistances R200, 201. Incidentally, although the example in which the PMOS transistor is used as M200 is described in this embodiment, the present invention is not limited to this example. An NMOS transistor, an NPN transistor, or a PNP transistor is used in some cases.

Figure 3:
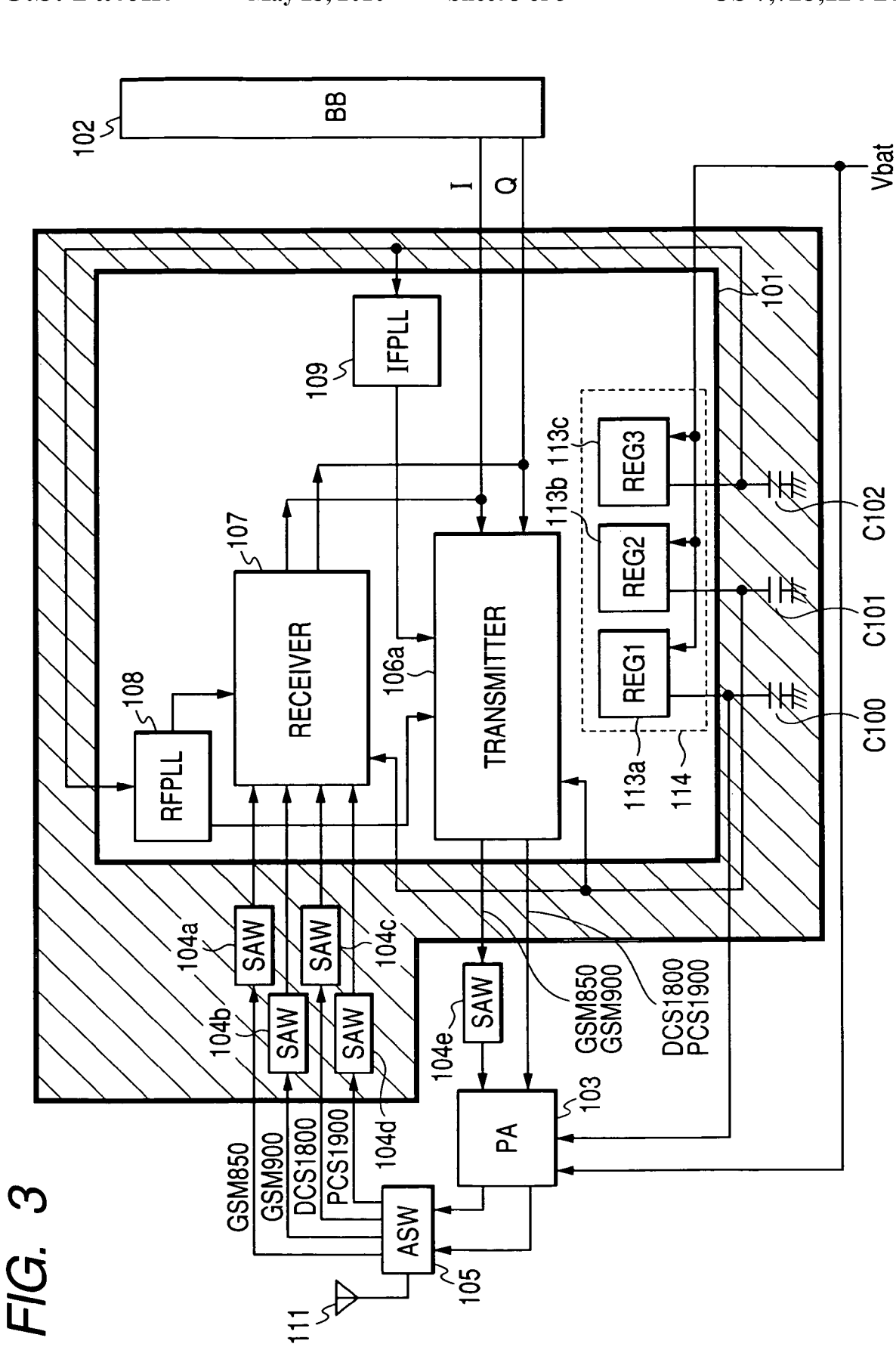
FIG. 3 is a diagram illustrating one embodiment of a mobile terminal that uses a transmitter-receiver with a built-in regulator.

FIG. 3 is a block diagram illustrating how the essential part of a mobile terminal compatible with GSM 850, GSM 900, DCS 1800 and PCS 1900 is configured according to another embodiment of the present invention. The embodiment shown in FIG. 3 is different from that shown in FIG. 1 in that a block included in reference numeral 100 is provided as a module. As is the case with the wiring on the mobile terminal, the wiring resistance of wiring on the module can be reduced. Therefore, it is possible to produce the same effects as those in the embodiment shown in FIG. 1.

Figure 4:
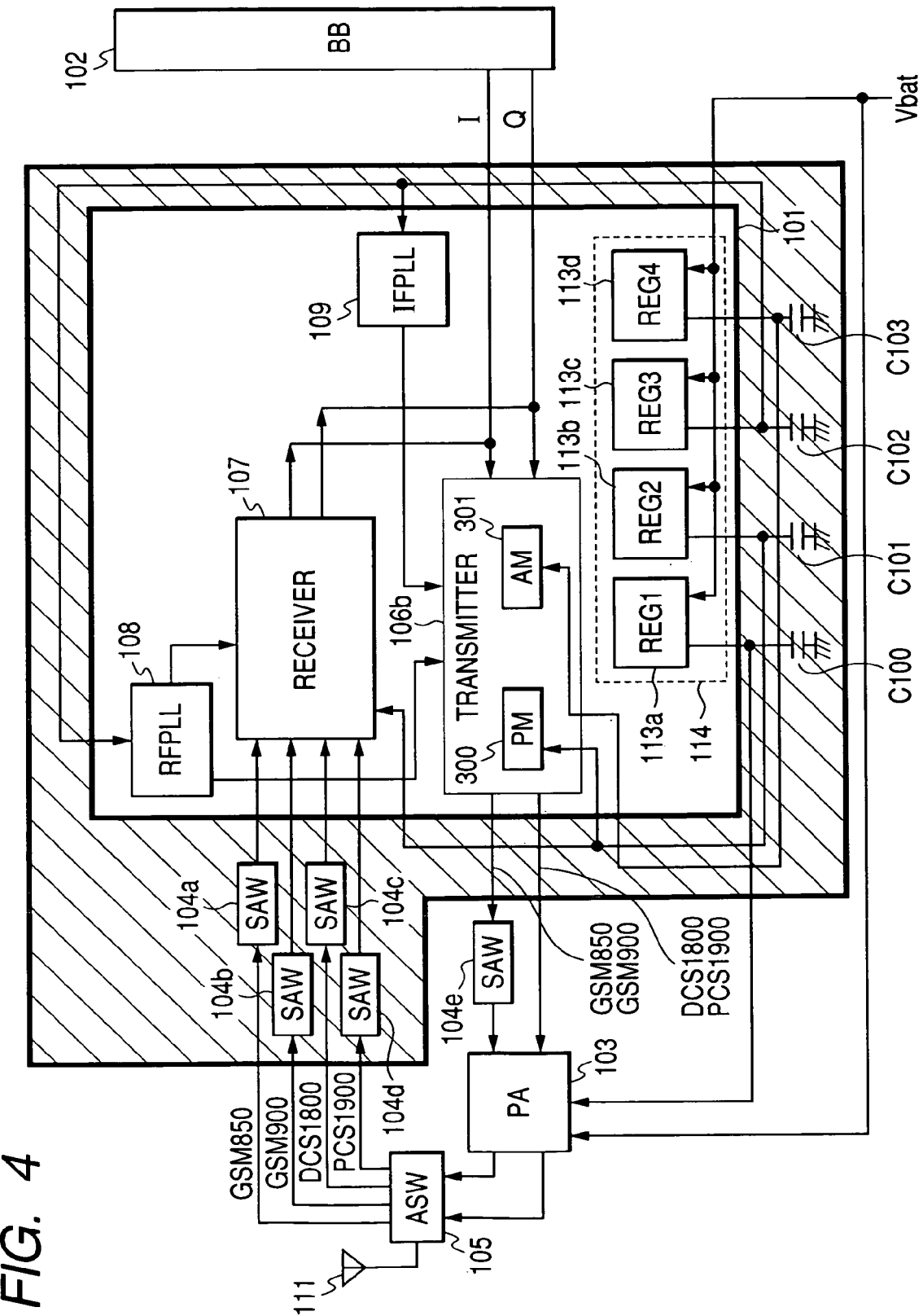
FIG. 4 is a diagram illustrating one embodiment of a mobile terminal that uses a transmitter-receiver with a built-in regulator.

FIG. 4 is a block diagram illustrating how the essential part of a mobile terminal compatible with GSM 850, GSM 900, DCS 1800, PCS 1900 is configured according to another embodiment of the present invention. The embodiment shown in FIG. 4 is different from that shown in FIG. 3 in that a regulator 113d is added to the regulator part 114, and in that two regulators 113b, 113d supply the supply voltage to the transmitter 106a in the embodiment shown in FIG. 4, whereas only the regulator 113b supplies the supply voltage to the transmitter 106a in the embodiment shown in FIG. 3. In addition, the transmitter 106b is a transmitter that supports, as modulated signals, both the GMSK (Gaussian minimum shift keying) modulation and the 8PSK modulation used for the EDGE (Enhanced data for global evolution) specifications. The transmitter 106b includes: a PM circuit block 300 which is used only for transmission of phase information of a modulated signal; an AM circuit block 301 which is used for transmission of amplitude information or for transmission of both the amplitude information and the phase information.

The regulator 113b supplies the supply voltage to the PM circuit block 300, and the regulator 113d supplies the supply voltage to the AM circuit block 301. Thus, by using the respective different regulators to supply the supply voltages to the PM circuit block 300 and the AM circuit block 301, it is possible to suppress unnecessary interaction of the phase information with the amplitude information, and accordingly it is expected that the deterioration in properties of the transmitter 106b will be reduced.

Incidentally, what is important in this embodiment is that, as described above, the respective different regulators are used to supply the supply voltages to the PM circuit block 300 and the AM circuit block 301. Therefore, it is not always necessary to configure the mobile terminal exactly as shown in FIG. 4. For example, the regulator 113d supplies the supply voltage to the PM circuit block 300, whereas the regulator 113b supplies the supply voltage to the AM circuit block 301.

Figure 5:
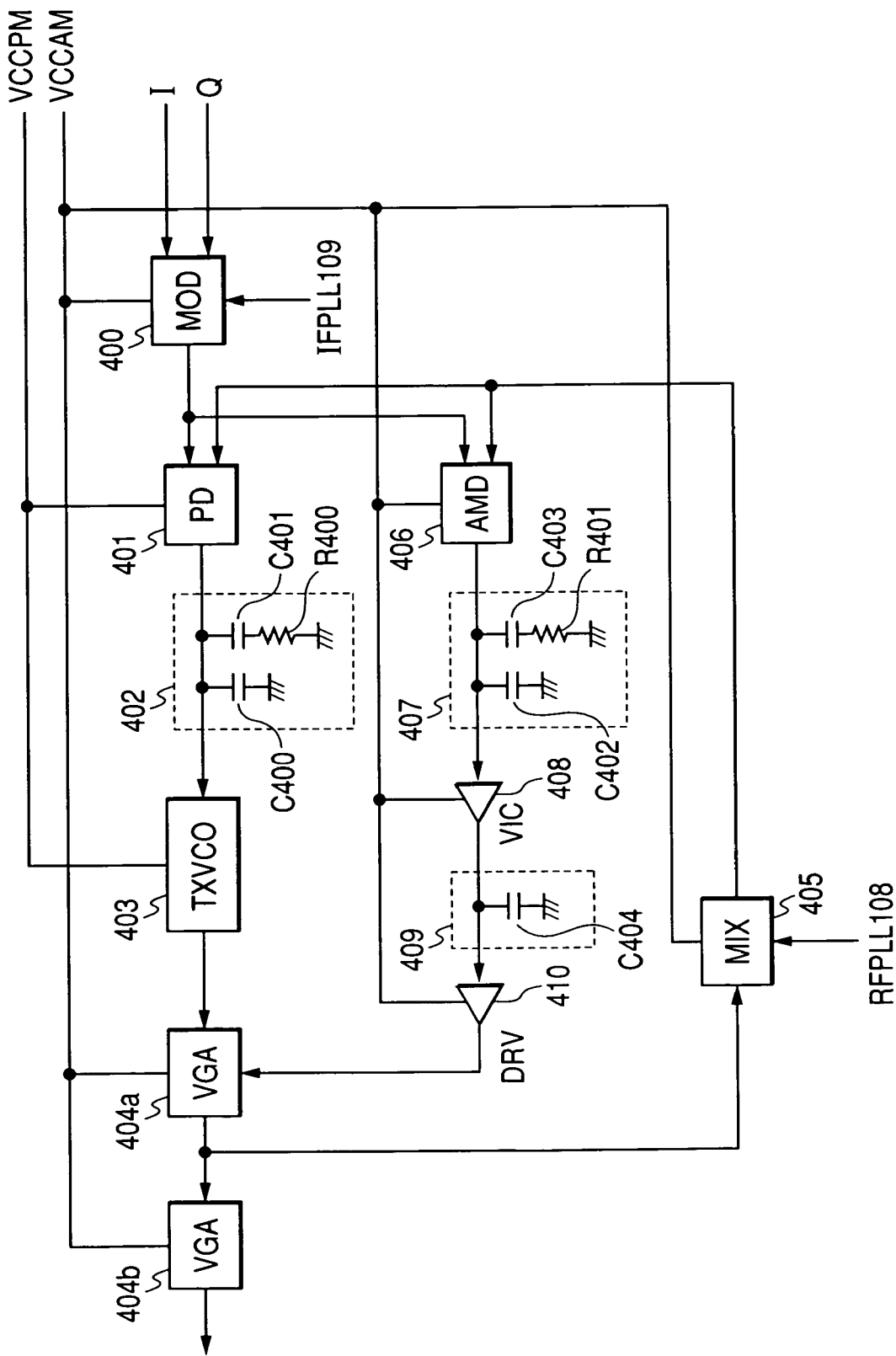
FIG. 5 is a diagram illustrating one embodiment of a transmitter.

FIG. 5 is a block diagram illustrating how the essential part of the transmitter 106b shown in FIG. 4 is configured according to one embodiment. The transmitter 106b comprises: a quadrature modulator (hereinafter referred to as "MOD") 400; a phase comparator (hereinafter referred to as "PD") 401; a filter 402; a TXVCO 403; variable-gain amplifiers (hereinafter referred to as "VGA") 404a, 404b; a mixer 405; an envelope comparator (hereinafter referred to as "AMD") 406; a filter 407; a voltage-to-current converter (hereinafter referred to as "VIC") 408; a filter 409; and a buffer amplifier (hereinafter referred to as "DRV") 410. The filter 402 includes capacitors C400, C401, and a resistor R400. The filter 407 includes capacitors C402, 403, and a resistor R401. The filter 409 includes a capacitor C404.

The PM circuit block 300 shown in FIG. 4 includes the PD 401, and the TXVCO 403. The AM circuit block 301 shown in FIG. 4 includes the MOD 400, the VGAs 404a, 404b, the AMD 406, the VIC 408, the DRV 410, and the MIX 405.

The MOD 400 performs quadrature modulation of an inputted IQ signal by use of an output signal from the IFPLL 109.

The PD 401 outputs an electric current whose value is in proportion to the phase difference between two input signals.

The filter 402 suppresses unnecessary signals included in the output signal of the PD 401.

The TXVCO 403 is a voltage-controlled oscillator for outputting a signal whose frequency is determined by the output-signal voltage of the filter 402.

The VGA 404a is a variable-gain amplifier whose gain is determined by a first control voltage.

The mixer 405 down-converts a frequency of an input signal by use of an output signal of the RFPLL 108.

The AMD 406 outputs an electric current whose value is in proportional to the difference in envelope voltage between two input signals.

The filter 407 suppresses unnecessary signals included in the output signal of the ADM 406.

The VIC 408 converts the input voltage into an current signal.

The filter 409 suppresses unnecessary signals included in the output signal of the VIC 408.

The DRV 410 provides the input voltage with a specified gain. The output voltage becomes the first control voltage of the VGA 404a.

The VGA 404b is a variable-gain amplifier whose gain is determined by a second control voltage.

The PD 401, the filter 402, the TXVCO 403, the VGA 404a, and the MIX 405 form a phase-locked loop in which a phase of an output signal of the MOD 400 is used as a reference signal. As a result, the output signal phase of the MOD 400 is obtained at the output of the VGA 404a. In addition, a frequency of an output signal of the VGA 404a becomes a difference frequency between a frequency of an output signal of the RFPLL 108 and a frequency of an output signal of the MOD 400.

The AMD 406, the filter 407, the VIC 408, the filter 409, the DRV 410, the VGA 404a, and the MIX 405 form an envelope-locked loop in which an envelope of an output signal of the MOD 400 is used as a reference signal. As a result, the output signal envelope of the MOD 400 is obtained at the output of the VGA 404a.

Since the phase-locked loop and the envelope-locked loop work as described above, the phase and envelope of the output signal of the MOD 400 are obtained by the output signal of the VGA 404a in the end, and the frequency thereof is determined by the output frequency of the IFPLL 109 and that of the RFPLL 108. In other words, the transmitter according to this embodiment can perform frequency conversion while storing inputted modulation information.

Figure 6:
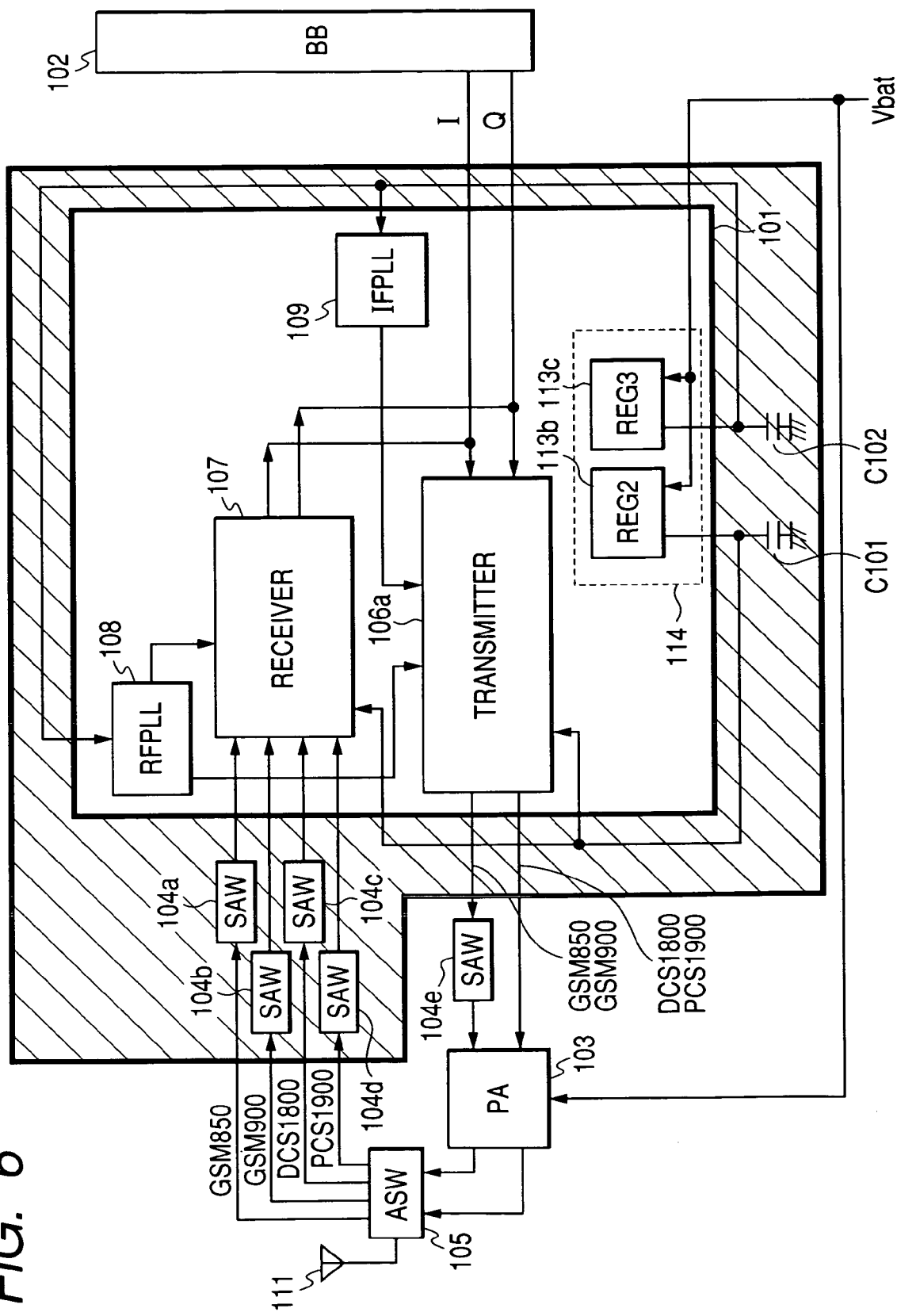
FIG. 6 is a diagram illustrating one embodiment of a mobile terminal that uses a transmitter-receiver with a built-in regulator.
Figure 7:
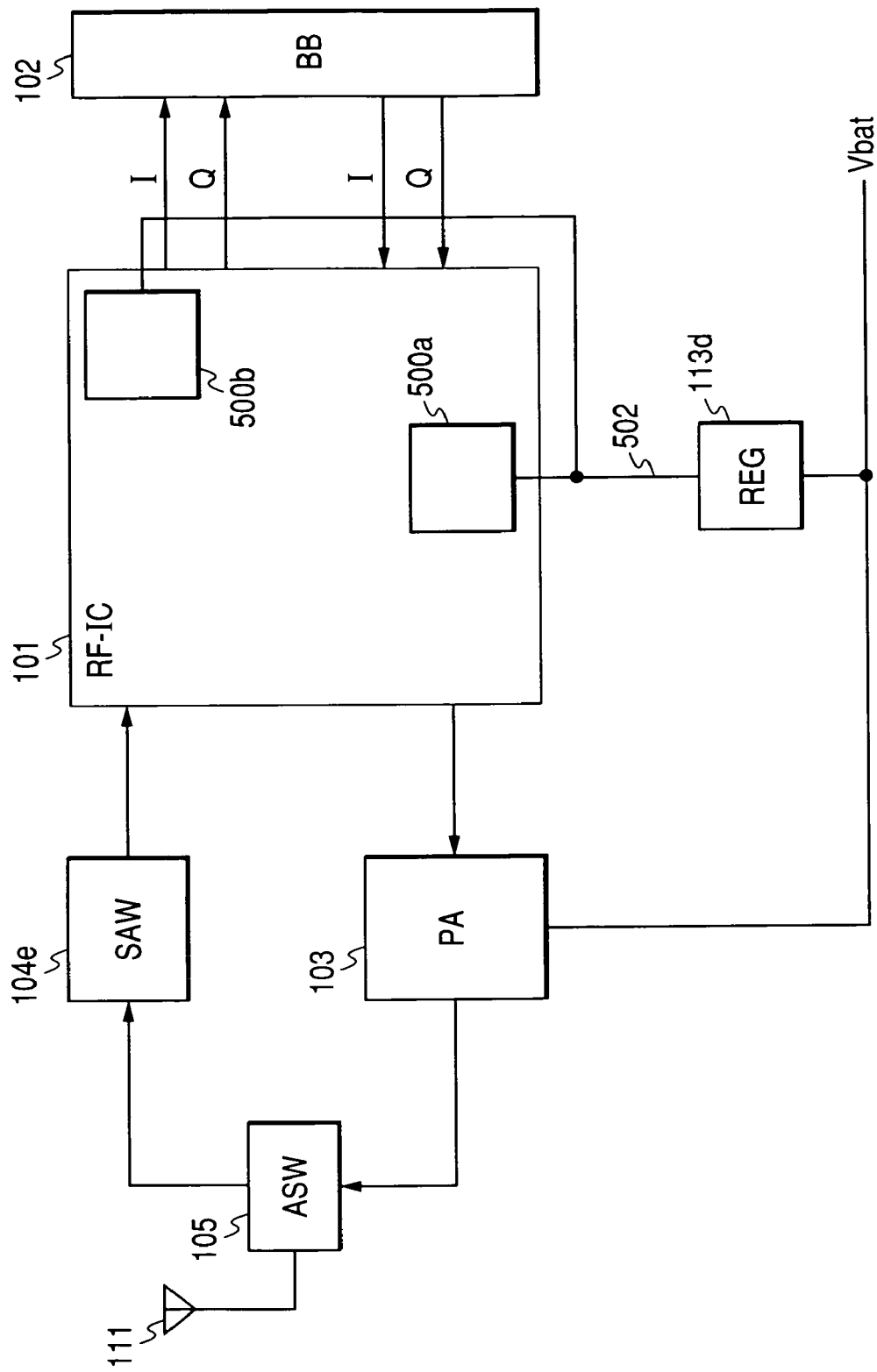
FIG. 7 is a diagram illustrating a conventional example.
Figure 8:
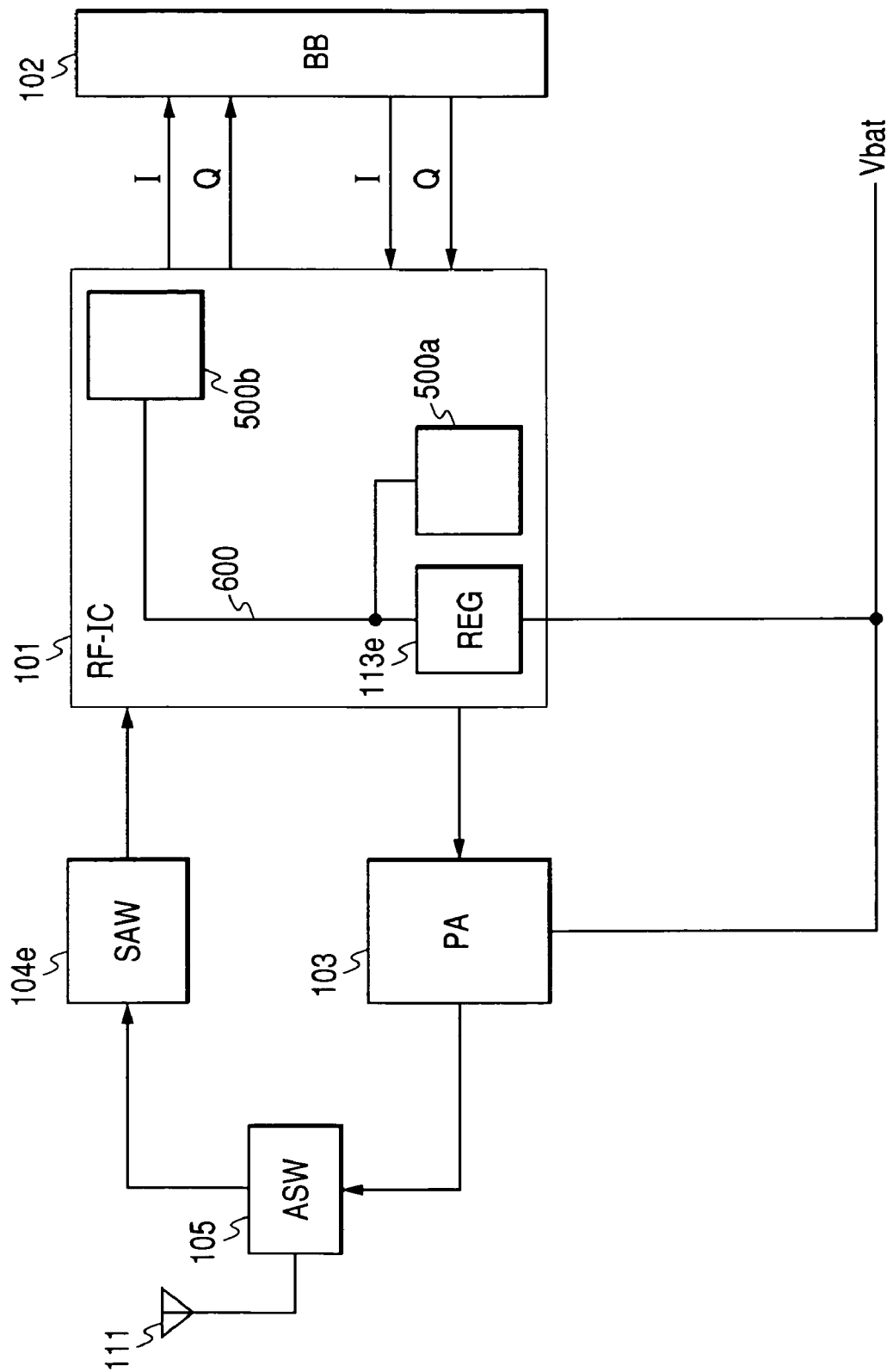
FIG. 8 is a diagram illustrating technical problems.

FIG. 6 is a block diagram illustrating how the essential part of a mobile terminal compatible with GSM 850, GSM 900, DCS 1800 and PCS 1900 are configured according to another embodiment of the present invention. The embodiment shown in FIG. 6 is different from that shown in FIG. 3 in that it is not necessary to supply the supply voltage from the RF-IC 101 to the PA 103. Therefore, it becomes unnecessary to use the regulator 113a and the capacitor C100 shown in FIG. 3. The PA 103 generates all required voltage signals from the voltage Vbat.

Incidentally, although the above embodiment has been described using the example compatible with GSM 850, GSM 900, DCS 1800, and PCS 1900, needless to say, the present invention is not limited to this example. For example, there is also a case where only GSM 900 is used, or a case where GSM 900 and DCS 1800 are used in combination. Further, there is also a case where other applications (for example, W-CDMA) are used. Moreover, there is also a case where the SAW 104e is not used.

Incidentally, the reference numerals used in the diagrams of the present application will be listed below.
100 . . . Module
101 . . . Transmitter-receiver
102 . . . Base band
103 . . . Power amplifier
104 . . . SAW filter
105 . . . Antenna switch
106 . . . Transmitter
107 . . . Receiver
108 . . . RFPLL
109 . . . IFPLL
111 . . . Antenna
113 . . . Regulator
114 . . . Regulator part
200 . . . Reference-voltage generation circuit
201 . . . Operational amplifier
300 . . . PM circuit block
301 . . . AM circuit block
400 . . . Quadrature modulator
401 . . . Phase comparator
402, 407, 409 . . . Filters
403 . . . TXVCO
404 . . . Variable-gain amplifier
405 . . . Mixer
406 . . . Envelope comparator
408 . . . Voltage-to-current converter
410 . . . Buffer amplifier

What is claimed is:

1. A semiconductor device comprising:
    an IC on which a transmitter, a receiver, a frequency synthesizer, and a regulator are commonly formed on the same said IC;
    a module on which said IC is mounted; and
    a mobile terminal substrate having a semiconductor circuit device including the module;
    wherein a supply voltage of each of the transmitter, the receiver, and the frequency synthesizer is supplied from the regulator that is formed inside said IC to each of the transmitter, the receiver, and the frequency synthesizer that are provided inside said IC via wiring that is provided outside said IC at least either on the module or on the mobile terminal substrate.

2. The semiconductor device according to claim 1, wherein a capacitor connected to an output terminal of the regulator is mounted on the module.

3. The semiconductor device according to claim 1, wherein a filter which is connected to an input terminal of the receiver is mounted on the module.

4. The semiconductor device according to claim 1,
    wherein a capacitor connected to an output terminal of the regulator and a filter connected to an input terminal of the receiver are mounted on the module.

5. The semiconductor device according to claim 1,
    wherein said regulator is connected, through wiring formed on said IC, to wiring that is provided at least either on the module or on the mobile terminal substrate.

6. The semiconductor device according to claim 1,
    wherein a pattern width of the wiring which is provided at least either on the module or on the mobile terminal substrate is greater than a pattern width of wiring formed on said IC.

7. The semiconductor device according to claim 1, wherein said regulator is constituted of a first regulator and a second regulator,
    wherein the first regulator supplies a supply voltage to the transmitter and the receiver, and
    wherein the second regulator supplies a supply voltage to the frequency synthesizer.

8. The semiconductor device according to claim 7,
    wherein the first regulator and the second regulator use a common reference input voltage.

9. The semiconductor device according to claim 1,
    wherein said regulator is constituted of a first regulator, a second regulator, and a third regulator,
    wherein the first regulator supplies a supply voltage to the transmitter and the receiver,
    wherein the second regulator supplies a supply voltage to the frequency synthesizer, and
    wherein the third regulator supplies a supply voltage to a power amplifier which provides an output signal of the transmitter with a specified gain.

10. The semiconductor device according to claim 9,
    wherein the first regulator, the second regulator, and the third regulator use a common reference input voltage.

11. The semiconductor device according to claim 1,
    wherein said regulator is constituted of a first regulator, a second regulator, an third regulator, and a fourth regulator, and
    wherein if said transmitter comprises circuits including an AM circuit block and a PM circuit block,
    wherein one of the first and second regulators supplies a supply voltage to the PM circuit block and the receiver,
    wherein the other of the first and second regulators supplies a supply voltage to the AM circuit block,
    wherein the third regulator supplies a supply voltage to the frequency synthesizer, and
    wherein the fourth regulator supplies a supply voltage to a power amplifier which provides an output signal of the transmitter with a specified gain.

12. The semiconductor device according to claim 11,
wherein the first regulator, the second regulator, the third regulator, and the fourth regulator use a common reference input voltage.

13. The semiconductor device according to claim 1,
wherein said transmitter includes a phase-locked loop which is synchronized with a phase of a reference signal, and an envelope-locked loop which is synchronized with an envelope of the reference signal, said transmitter being a transmitter that forms an output signal by combining phase information with envelope information that are synchronized with the reference signal, and
wherein said regulator is constituted of at least a regulator for supplying a supply voltage to a circuit used for transmission of the phase of the reference signal, and a regulator for supplying the supply voltage to a circuit that is used for transmission of the envelope of the reference signal or for transmission of both the envelope of the reference signal and the phase of the reference signal.

14. A module including an IC, comprising a transmitter, a receiver, a frequency synthesizer, and a regulator commonly formed on the same said IC,
wherein said IC comprises: a power supply terminal of each of the transmitter, the receiver, and the frequency synthesizer: and an output terminal of the regulator,
wherein wiring which is connected to the power supply terminal of each of the transmitter, the receiver, and the frequency synthesizer at an end thereof and to the output terminal of the regulator at the other end thereof is formed outside said IC on the module.

15. The module according to claim 14,
wherein a filter connected to an input terminal of the receiver is mounted on the module.

16. The module according to claim 14,
wherein a filter connected to an input terminal of the receiver and a capacitor connected to the regulator are mounted on the module.

* * * * *